US012141756B1

(12) United States Patent
Beauchamp et al.

(10) Patent No.: US 12,141,756 B1
(45) Date of Patent: Nov. 12, 2024

(54) SYSTEMS AND METHODS TO GENERATE PROJECT-LEVEL GRAPHICAL USER INTERFACES WITHIN A COLLABORATION ENVIRONMENT

(71) Applicant: ASANA, INC., San Francisco, CA (US)

(72) Inventors: Tyler Jeffrey Beauchamp, Bismarck, ND (US); Reyana Fayyaz, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

(21) Appl. No.: 17/329,021

(22) Filed: May 24, 2021

(51) Int. Cl.
*G06Q 10/10* (2023.01)
*G06F 3/0482* (2013.01)
*G06Q 10/0631* (2023.01)

(52) U.S. Cl.
CPC ......... *G06Q 10/103* (2013.01); *G06F 3/0482* (2013.01); *G06Q 10/06313* (2013.01)

(58) Field of Classification Search
CPC ........... G06Q 10/103; G06Q 10/06313; G06Q 10/063114; G06Q 10/0633; G06Q 10/0639; G06Q 10/063; G06F 3/0482; G06F 3/0484; G06F 16/287; G06F 8/65; G06F 3/0481; G06F 11/3409; G06F 16/23
USPC ....................................................... 705/7.23
See application file for complete search history.

(56) References Cited

U.S. PATENT DOCUMENTS

| | | |
|---|---|---|
| 5,233,687 A | 8/1993 | Henderson, Jr. |
| 5,524,077 A | 6/1996 | Faaland |
| 5,530,861 A | 6/1996 | Diamant |
| 5,548,506 A | 8/1996 | Srinivasan |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

Macro, computer science, wikipedia, archives org Feb. 11, 2020 http://web.archive.org/web/20200211082902/https://en.wikipedia.org/wiki/Macro_(computer_science) (Year: 2020).

(Continued)

*Primary Examiner* — Rutao Wu
*Assistant Examiner* — Letoria G Knight
(74) *Attorney, Agent, or Firm* — Esplin & Associates, PC

(57) ABSTRACT

Systems and methods to recommend templates for project-level graphical user interfaces within a collaboration environment are described herein. Exemplary implementations may: manage environment state information maintaining a collaboration environment; manage information defining project-level graphical user interfaces of the collaboration environment; dynamically update information defining the project-level graphical user interfaces of the collaboration environment as values of one or more of project parameters of individual projects change; effectuate presentation of the project-level graphical user interfaces for the individual projects in the collaboration environment; and/or perform other operations.

18 Claims, 3 Drawing Sheets

(56) References Cited

U.S. PATENT DOCUMENTS

| | | | |
|---|---|---|---|
| 6,024,093 A | 2/2000 | Cron | |
| 6,256,651 B1 | 7/2001 | Tuli | |
| 6,292,830 B1 | 9/2001 | Taylor | |
| 6,332,147 B1 | 12/2001 | Moran | |
| 6,385,639 B1 | 5/2002 | Togawa | |
| 6,578,004 B1 | 6/2003 | Cimral | |
| 6,621,505 B1 | 9/2003 | Beauchamp | |
| 6,629,081 B1 | 9/2003 | Cornelius | |
| 6,769,013 B2 | 7/2004 | Frees | |
| 6,859,523 B1 | 2/2005 | Jilk | |
| 7,020,697 B1 | 3/2006 | Goodman | |
| 7,039,596 B1 | 5/2006 | Lu | |
| 7,086,062 B1 | 8/2006 | Faour | |
| 7,349,920 B1 | 3/2008 | Feinberg | |
| 7,418,482 B1 | 8/2008 | Lusher | |
| 7,428,723 B2 | 9/2008 | Greene | |
| 7,640,511 B1 | 12/2009 | Keel | |
| 7,676,542 B2 | 3/2010 | Moser | |
| 7,779,039 B2 | 8/2010 | Weissman | |
| 7,805,327 B1 | 9/2010 | Schulz | |
| RE41,848 E | 10/2010 | Daniell | |
| 7,917,855 B1 | 3/2011 | Satish | |
| 7,991,632 B1 | 8/2011 | Morris | |
| 7,996,744 B2 | 8/2011 | Ojala | |
| 7,996,774 B1 | 8/2011 | Sidenur | |
| 8,214,747 B1 | 7/2012 | Yankovich | |
| 8,314,809 B1 | 11/2012 | Grabowski | |
| 8,499,300 B2 | 7/2013 | Zimberg | |
| 8,522,240 B1 | 8/2013 | Merwarth | |
| 8,527,287 B1 | 9/2013 | Bhatia | |
| 8,554,832 B1 | 10/2013 | Moskovitz | |
| 8,572,477 B1 | 10/2013 | Moskovitz | |
| 8,627,199 B1 | 1/2014 | Handley | |
| 8,639,552 B1 | 1/2014 | Chen | |
| 8,768,751 B2 | 7/2014 | Jakowski | |
| 8,831,879 B2 | 9/2014 | Stamm | |
| 8,843,832 B2 | 9/2014 | Frields | |
| 8,863,021 B1 | 10/2014 | Bee | |
| 9,009,096 B2 | 4/2015 | Pinckney | |
| 9,024,752 B2 | 5/2015 | Tumayan | |
| 9,143,839 B2 | 9/2015 | Reisman | |
| 9,152,668 B1 | 10/2015 | Moskovitz | |
| 9,189,756 B2 | 11/2015 | Gilbert | |
| 9,201,952 B1 | 12/2015 | Chau | |
| 9,208,262 B2 | 12/2015 | Bechtel | |
| 9,251,484 B2 | 2/2016 | Cantor | |
| 9,350,560 B2 | 5/2016 | Hupfer | |
| 9,383,917 B2 | 7/2016 | Mouton | |
| 9,405,532 B1 | 8/2016 | Sullivan | |
| 9,405,810 B2 | 8/2016 | Smith | |
| 9,454,623 B1 | 9/2016 | Kaptsan | |
| 9,514,424 B2 | 12/2016 | Kleinbart | |
| 9,600,136 B1 | 3/2017 | Yang | |
| 9,674,361 B2 | 6/2017 | Ristock | |
| 9,712,576 B1 | 7/2017 | Gill | |
| 9,785,445 B2 | 10/2017 | Mitsui | |
| 9,830,398 B2 | 11/2017 | Schneider | |
| 9,842,312 B1 | 12/2017 | Rosati | |
| 9,949,681 B2 | 4/2018 | Badenes | |
| 9,953,282 B2 | 4/2018 | Shaouy | |
| 9,959,420 B2 | 5/2018 | Kiang | |
| 9,978,040 B2 | 5/2018 | Lee | |
| 9,990,636 B1 | 6/2018 | Lewis | |
| 10,001,911 B2 | 6/2018 | Breedvelt-Schouten | |
| 10,003,693 B2 | 6/2018 | Wolthuis | |
| 10,083,412 B2 | 9/2018 | Suntinger | |
| 10,157,355 B2 | 12/2018 | Johnson | |
| 10,192,181 B2 | 1/2019 | Katkar | |
| 10,235,156 B2 | 3/2019 | Johnson | |
| 10,264,067 B2 | 4/2019 | Subramani | |
| 10,308,992 B2 | 6/2019 | Chauvin | |
| 10,373,084 B2 | 8/2019 | Kurjanowicz | |
| 10,373,090 B2 | 8/2019 | Holm | |
| 10,382,501 B2 | 8/2019 | Malatesha | |
| 10,454,911 B2 * | 10/2019 | Hanhirova | H04L 63/08 |
| 10,455,011 B2 | 10/2019 | Kendall | |
| 10,496,943 B2 | 12/2019 | De | |
| 10,586,211 B2 | 3/2020 | Steplyk | |
| 10,594,788 B2 | 3/2020 | Larabie-Belanger | |
| 10,606,859 B2 | 3/2020 | Smith | |
| 10,613,735 B1 | 4/2020 | Karpe | |
| 10,616,151 B1 | 4/2020 | Cameron | |
| 10,623,359 B1 | 4/2020 | Rosenstein | |
| 10,671,692 B2 | 6/2020 | Koopman | |
| 10,684,870 B1 | 6/2020 | Sabo | |
| 10,706,484 B1 | 7/2020 | Murnock | |
| 10,785,046 B1 | 9/2020 | Raghavan | |
| 10,810,222 B2 | 10/2020 | Koch | |
| 10,846,105 B2 | 11/2020 | Granot | |
| 10,846,297 B2 | 11/2020 | Smith | |
| 10,922,104 B2 | 2/2021 | Sabo | |
| 10,956,845 B1 | 3/2021 | Sabo | |
| 10,970,299 B2 | 4/2021 | Smith | |
| 10,977,434 B2 | 4/2021 | Pelz | |
| 10,983,685 B2 | 4/2021 | Karpe | |
| 11,082,281 B2 | 8/2021 | Justin | |
| 11,095,468 B1 | 8/2021 | Pandey | |
| 11,113,667 B1 | 9/2021 | Jiang | |
| 11,138,021 B1 | 10/2021 | Rosenstein | |
| 11,140,174 B2 | 10/2021 | Patel | |
| 11,204,683 B1 | 12/2021 | Sabo | |
| 11,212,242 B2 | 12/2021 | Cameron | |
| 11,263,228 B2 | 3/2022 | Koch | |
| 11,288,081 B2 | 3/2022 | Sabo | |
| 11,290,296 B2 | 3/2022 | Raghavan | |
| 11,327,645 B2 | 5/2022 | Karpe | |
| 11,341,444 B2 | 5/2022 | Sabo | |
| 11,341,445 B1 | 5/2022 | Cheng | |
| 11,422,869 B2 * | 8/2022 | Emerick | G06F 3/0483 |
| 11,443,281 B2 | 9/2022 | Culver | |
| 11,500,620 B2 | 11/2022 | Scolnick | |
| 2002/0065798 A1 | 5/2002 | Bostleman | |
| 2002/0082889 A1 | 6/2002 | Oliver | |
| 2002/0143594 A1 | 10/2002 | Kroeger | |
| 2003/0028595 A1 | 2/2003 | Vogt | |
| 2003/0036934 A1 | 2/2003 | Ouchi | |
| 2003/0041317 A1 | 2/2003 | Sokolov | |
| 2003/0097406 A1 | 5/2003 | Stafford | |
| 2003/0097410 A1 | 5/2003 | Atkins | |
| 2003/0106039 A1 * | 6/2003 | Rosnow | G06Q 10/06 717/100 |
| 2003/0126001 A1 | 7/2003 | Northcutt | |
| 2003/0200223 A1 | 10/2003 | Hack | |
| 2003/0225598 A1 | 12/2003 | Yu | |
| 2003/0233265 A1 | 12/2003 | Lee | |
| 2003/0233268 A1 | 12/2003 | Taqbeem | |
| 2004/0083448 A1 | 4/2004 | Schulz | |
| 2004/0093290 A1 | 5/2004 | Doss | |
| 2004/0093351 A1 | 5/2004 | Lee | |
| 2004/0098291 A1 | 5/2004 | Newburn | |
| 2004/0122693 A1 | 6/2004 | Hatscher | |
| 2004/0125150 A1 | 7/2004 | Adcock | |
| 2004/0162833 A1 | 8/2004 | Jones | |
| 2004/0187089 A1 | 9/2004 | Schulz | |
| 2004/0207249 A1 | 10/2004 | Baumgartner | |
| 2004/0230447 A1 * | 11/2004 | Schwerin-Wenzel | G06Q 10/10 705/300 |
| 2004/0268451 A1 | 12/2004 | Robbin | |
| 2005/0027582 A1 | 2/2005 | Chereau | |
| 2005/0210394 A1 | 9/2005 | Crandall | |
| 2005/0216111 A1 | 9/2005 | Ooshima | |
| 2005/0222971 A1 | 10/2005 | Cary | |
| 2006/0028917 A1 | 2/2006 | Wigginton | |
| 2006/0047454 A1 | 3/2006 | Tamaki | |
| 2006/0085245 A1 | 4/2006 | Takatsuka | |
| 2006/0095859 A1 | 5/2006 | Bocking | |
| 2006/0136441 A1 | 6/2006 | Fujisaki | |
| 2006/0143270 A1 | 6/2006 | Wodtke | |
| 2006/0167736 A1 | 7/2006 | Weiss | |
| 2006/0190391 A1 | 8/2006 | Cullen, III | |
| 2006/0200264 A1 | 9/2006 | Kodama | |
| 2006/0218551 A1 | 9/2006 | Berstis | |
| 2006/0224430 A1 | 10/2006 | Butt | |

(56) References Cited

U.S. PATENT DOCUMENTS

| | | |
|---|---|---|
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0034314 A1* | 2/2008 | Louch .................. G06F 3/0481 715/764 |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0133736 A1 | 6/2008 | Wensley |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2008/0313110 A1 | 12/2008 | Kreamer |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199113 A1* | 8/2009 | McWhinnie ........... G06Q 10/10 715/762 |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0235182 A1 | 9/2009 | Kagawa |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0100594 A1* | 4/2010 | Frees .................... G06Q 10/10 709/205 |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0306007 A1 | 12/2010 | Ganapathyraj |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1* | 5/2012 | Culver ................. G06Q 10/101 709/205 |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0226617 A1 | 9/2012 | Kay |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0080919 A1 | 3/2013 | Kiang |
| 2013/0103412 A1 | 4/2013 | Nudd |
| 2013/0124254 A1 | 5/2013 | Jafri |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0198676 A1* | 8/2013 | Garrett ................. G06F 3/0484 715/772 |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |

(56) References Cited

U.S. PATENT DOCUMENTS

| | | |
|---|---|---|
| 2014/0012616 A1* | 1/2014 | Moshenek ..... G06Q 10/063114 705/7.15 |
| 2014/0025767 A1* | 1/2014 | De Kezel ............. G06Q 10/107 709/206 |
| 2014/0036639 A1 | 2/2014 | Taber |
| 2014/0040780 A1 | 2/2014 | Artzt |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0143000 A1 | 5/2014 | Kay |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0304836 A1 | 10/2014 | Velamoor |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0098561 A1* | 4/2015 | Etison ............... G06Q 10/06398 379/265.06 |
| 2015/0113540 A1 | 4/2015 | Rabinovici |
| 2015/0134393 A1 | 5/2015 | De |
| 2015/0153906 A1 | 6/2015 | Liao |
| 2015/0193735 A1 | 7/2015 | Lavrov |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363481 A1 | 12/2015 | Haynes |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1* | 5/2016 | Figlin ............ G06Q 10/063114 705/7.15 |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0234391 A1 | 8/2016 | Wolthuis |
| 2016/0275068 A1 | 9/2016 | Wenzel |
| 2016/0275436 A1 | 9/2016 | Kurjanowicz |
| 2016/0307210 A1 | 10/2016 | Agarwal |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0147960 A1* | 5/2017 | Jahagirdar ....... G06Q 10/06313 |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0206501 A1 | 7/2017 | Wang |
| 2017/0249574 A1 | 8/2017 | Knijnik |
| 2017/0249577 A1 | 8/2017 | Nishikawa |
| 2017/0316358 A1 | 11/2017 | Candito |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0337517 A1 | 11/2017 | Defusco |
| 2017/0344754 A1 | 11/2017 | Kumar |
| 2017/0346861 A1 | 11/2017 | Pearl |
| 2017/0351385 A1 | 12/2017 | Ertmann |
| 2017/0364214 A1* | 12/2017 | Javed .................... G06F 3/0482 |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0082255 A1 | 3/2018 | Rosati |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189735 A1 | 7/2018 | Lo |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0284959 A1* | 10/2018 | Alphin, III ........... G06Q 10/109 |
| 2018/0285471 A1 | 10/2018 | Hao |
| 2018/0285746 A1 | 10/2018 | Dunwoody |
| 2018/0300305 A1 | 10/2018 | Lam |
| 2018/0316636 A1 | 11/2018 | Kamat |
| 2018/0331842 A1 | 11/2018 | Faulkner |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |

(56) References Cited

U.S. PATENT DOCUMENTS

| | | |
|---|---|---|
| 2019/0089581 A1 | 3/2019 | Purandare |
| 2019/0095839 A1 | 3/2019 | Itabayashi |
| 2019/0095846 A1 | 3/2019 | Gupta |
| 2019/0102071 A1* | 4/2019 | Redkina .............. G06F 16/30 |
| 2019/0102700 A1 | 4/2019 | Babu |
| 2019/0124169 A1* | 4/2019 | Sundin .............. H04L 67/535 |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0265821 A1 | 8/2019 | Pearl |
| 2019/0286462 A1 | 9/2019 | Bodnick |
| 2019/0318285 A1 | 10/2019 | Sebilleau |
| 2019/0340296 A1 | 11/2019 | Cunico |
| 2019/0340554 A1 | 11/2019 | Dotan-Cohen |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0005241 A1* | 1/2020 | Westwood ..... G06Q 10/063114 |
| 2020/0019907 A1 | 1/2020 | Notani |
| 2020/0050620 A1* | 2/2020 | Clark .............. G06N 20/00 |
| 2020/0059539 A1 | 2/2020 | Wang |
| 2020/0065736 A1 | 2/2020 | Relangi |
| 2020/0145239 A1 | 5/2020 | Ghods |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0035069 A1 | 2/2021 | Parikh |
| 2021/0049555 A1 | 2/2021 | Shor |
| 2021/0073697 A1 | 3/2021 | Paranjape |
| 2021/0097466 A1 | 4/2021 | Sabo |
| 2021/0097490 A1 | 4/2021 | Ratcliff |
| 2021/0103451 A1 | 4/2021 | Sabo |
| 2021/0110347 A1 | 4/2021 | Khalil |
| 2021/0136012 A1 | 5/2021 | Barbitta |
| 2021/0141996 A1 | 5/2021 | Agrawal |
| 2021/0149925 A1* | 5/2021 | Mann .............. G06F 16/252 |
| 2021/0157978 A1 | 5/2021 | Haramati |
| 2021/0182475 A1 | 6/2021 | Pelz |
| 2021/0209535 A1 | 7/2021 | Tezak |
| 2021/0216562 A1 | 7/2021 | Smith |
| 2021/0232282 A1 | 7/2021 | Karpe |
| 2021/0248304 A1 | 8/2021 | Olivier |
| 2021/0320891 A1 | 10/2021 | Rosenstein |
| 2021/0342361 A1 | 11/2021 | Radzewsky |
| 2021/0342785 A1 | 11/2021 | Mann |
| 2021/0342786 A1 | 11/2021 | Jiang |
| 2021/0382734 A1 | 12/2021 | Rosenstein |
| 2022/0019320 A1 | 1/2022 | Sabo |
| 2022/0019959 A1 | 1/2022 | Roy |
| 2022/0029886 A1 | 1/2022 | Hameiri |
| 2022/0058548 A1 | 2/2022 | Garg |
| 2022/0075792 A1 | 3/2022 | Koch |
| 2022/0078142 A1 | 3/2022 | Cameron |
| 2022/0101235 A1 | 3/2022 | Khalil |
| 2022/0158859 A1 | 5/2022 | Raghavan |
| 2022/0215315 A1 | 7/2022 | Sabo |
| 2022/0391921 A1 | 12/2022 | Wilner |
| 2023/0214509 A1 | 7/2023 | Kahawala |
| 2023/0252415 A1 | 8/2023 | Ackerman-Greenberg |
| 2023/0267419 A1 | 8/2023 | Beauchamp |
| 2023/0306370 A1 | 9/2023 | Clifton |
| 2024/0013153 A1 | 1/2024 | Jiang |

FOREIGN PATENT DOCUMENTS

| | | |
|---|---|---|
| CN | 102378975 B | 5/2015 |
| JP | 2008059035 A | 3/2008 |
| WO | 2015036817 A1 | 3/2015 |
| WO | 2015123751 A1 | 8/2015 |
| WO | 2016115621 A1 | 7/2016 |
| WO | 2020006634 A1 | 1/2020 |

OTHER PUBLICATIONS

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

(Tiburca, Andrew) Best Team Calendar Applications for 2018—Toggl https://toggl.com/blog/best-team-calendar-applications-for-2018 (Year: 2017).

Creating Tables with Fields from 2 Different Tables, published: 2009, publisher: StackOverflow, pp. 1-2. (Year: 2009).

"Rules of Data Conversion from Document to Relational Databases", published: 2014, publisher: Future-processing, pp. 1-8 (Year: 2014).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https:// web.archive.org/web/20160101054527/https://asana.com/product) (Year: 2016) 15 pages.

"U.S. Appl. No. 14/584,750, Examiner Interview Summary mailed Feb. 25, 2016", 3 pgs.

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https://www.youtube.com/watch?v=TLOruY1KyxU ( Year: 2017), 13 pages.

Asana Demo and Product Tour, you tube excerpt, Dec. 7, 2017 https://www.youtube.com/watch?v=IMAFWVLGFyw (Year: 2017) (16 pages).

(56) References Cited

OTHER PUBLICATIONS

Asana integrations, Asana tutorial, youtube, excerpt, Nov. 16, 2016 https://www.youtube.com/watch?v=hBiQ7DJNinE (Year: 2016) (21 pages).
Asana Workload and Portfolios, youtube, excerpt, Aug. 1, 2019 https://www.youtube.com/watch?v=7XkNcfFDG6M (Year: 2019) (20 pages).
Asana YouTube channel, list of all product videos, Nov 19th 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana, Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).
Biggs, "GateGuru Relaunches With New Ways to Streamline Your Travel Experience", Techcrunch, (Apr. 26, 2013), 3 pgs.
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
Command and control, wikipedia, archives org, Mar. 16, 2018 https://web.archive.org/web/20180316193655/https://en.wikipedia.org/wiki/Command_and_control (Year: 2018), 6 pages.
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTVVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv3o (Year: 2017) (24 pages).
How to Asana, Planning with Asana calendar, youtube excerpt, Feb. 14, 2017 https://www.youtube.com/watch?v=w816KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
www.cogmotive.com/blog/author/alan Alan Byrne: "Creating a company Shared Calendar in Office 365"; pp. 1-17; Sep. 10, 2013.
Hartmann, "TimeProjectscheduling with resource capacities and requests varying with time: a case study," 2013, Flexible services and manufacturing journal, vol. 25, No. 1, pp. 74-93 (Year: 2013).
Paul Minors, How to automate your tasks, youtube excerpts, Oct. 18, 2019 https://www.youtube.com/watch?v=IwF9XyUQrzw (Year: 2019).
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).
Assef, F., Cassius, T. S., & Maria, T. S. (2018). Confrontation between techniques of time measurement. Journal of Manufacturing Technology Management, 29(5), 789-810. (Year: 2018).
Dawei Li, "Deepcham: Collaborative Edge-Mediated Adaptive Deep Learning for Mobile Object Recognition", 2016, IEEE/ACM, pp. 64-76. (Year: 2016).
N. C. Romano, Fang Chen and J. F. Nunamaker, "Collaborative Project Management Software," Proceedings of the 35th Annual Hawaii International Conference on System Sciences, 2002, pp. 233-242, doi: 10.1109/HICSS.2002.993878.
Klipfoliio. "What is a Project Management Dashboard?". Jan. 18, 2021. <https://web.archive.org/web/20210128061955/https:// www.klipfolio.com/resources/articles/project-management-dashboard>(Year: 2021) 6 pages.
Shivakumar; Complete Guide to Digital Project Management; 2018; Apress; (https://doi.org/10.1007/978-1-4842-3417-4; last access Mar. 6, 2023).
Tsung-Yi Chen, Yuh-Min Chen, Hui-Chuan Chu, Developing a trust evaluation method between co-workers in virtual project team for enabling resource sharing and collaboration, Computers in Industry, vol. 59, Issue 6. (Year: 2008) 15 pages.

* cited by examiner

SYSTEMS AND METHODS TO GENERATE PROJECT-LEVEL GRAPHICAL USER INTERFACES WITHIN A COLLABORATION ENVIRONMENT

FIELD OF THE DISCLOSURE

The present disclosure relates to systems and methods to generate project-level graphical user interfaces within a collaboration environment.

BACKGROUND

Collaboration environments, sometimes referred to as work management platforms, may enable users to assign projects, tasks, or other assignments to assignees (e.g., other users) to complete. A collaboration environment may comprise an environment in which individual users and/or a virtual team of users does its work and may enable users to work in a more organized and efficient manner.

SUMMARY

One aspect of the present disclosure relates to a system configured to generate project-level graphical user interfaces within a collaboration environment. Generating an overview of a project may be useful because the project may be associated with a multitude of information. One or more implementations presented herein propose generating a project-level graphical user interface wherein the interface is partitioned into portions showing project-level information. These portions may include individual interface elements displaying values of one or more project parameters of the individual projects. These portions of the project-level graphical user interface may include one or more of a description portion, project roles portion, a resources portion, a supporting units of work portion, a status tracking portion, and/or other portions presenting other information. The information making up the project-level graphical user interface may be dynamically updated to provide users with an accurate representation of the state of a project.

One or more implementations of a system to generate project-level graphical user interfaces within a collaboration environment may include one or more hardware processors configured by machine-readable instructions and/or other components. Executing the machine-readable instructions may cause the one or more hardware processors to facilitate generating project-level graphical user interfaces within a collaboration environment. The machine-readable instructions may include one or more computer program components. The one or more computer program components may include one or more of an environment state component, an update component, a user interface component, and/or other components.

The environment state component may be configured to manage environment state information maintaining a collaboration environment and/or other information. The collaboration environment may be configured to facilitate interaction by users with the collaboration environment. The environment state information may define one or more of work unit records, project records, objective records, and/or other records. The work unit records may include work information comprising values of work unit parameters defining units of work managed, created, and/or assigned to the users within the collaboration environment. The project records may include project information comprising values for project parameters associated with projects managed within the collaboration environment. The objective records may include objective information comprising values of one or more objective parameters associated with business objectives. An individual project may include an individual set of the units of work. An individual project and/or an individual unit of work may support one or more business objectives.

The environment state component may be configured to manage information defining project-level graphical user interfaces of the collaboration environment. The individual project-level graphical user interfaces may correspond to individual projects. The individual project-level graphical user interfaces may include individual sets of interface elements displaying the values of one or more of the project parameters of the individual projects. By way of non-limiting illustration, a first project-level graphical user interface may be associated with a first project. The first project-level graphical user interface may include a first set of user interface elements displaying the values of a first set of project parameters of the first project.

The update component may be configured to dynamically update the information defining the project-level graphical user interfaces of the collaboration environment as the values of the one or more of the project parameters of the individual projects change and/or updated within the collaboration environment.

The user interface component may be configured to effectuate presentation of the project-level graphical user interfaces for the individual projects in the collaboration environment. By way of non-limiting illustration, the first project-level graphical user interface may be presented to dynamically reflect the values of the first set of project parameters of the first project.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
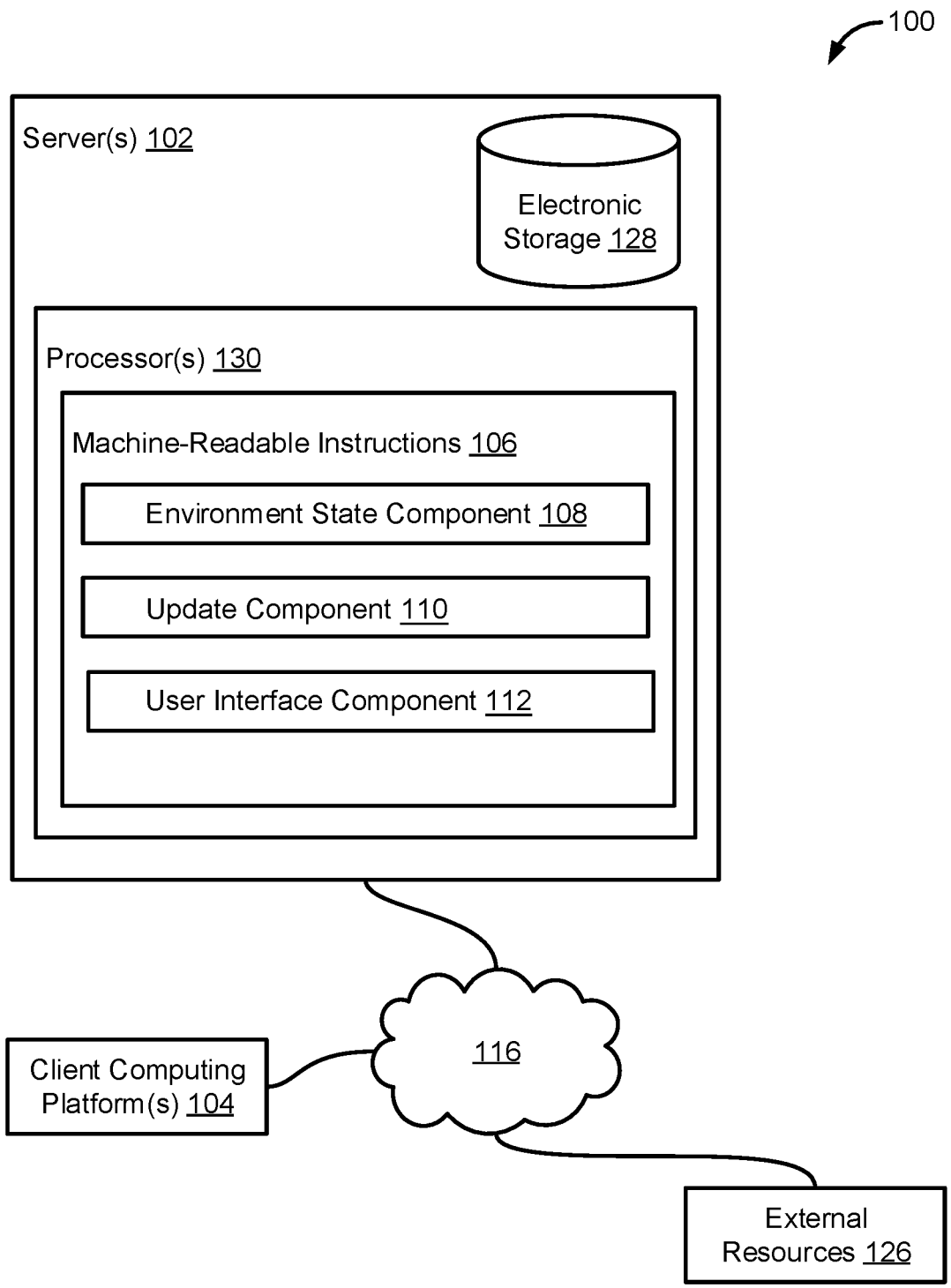
FIG. 1 illustrates a system configured to generate project-level graphical user interfaces within a collaboration environment, in accordance with one or more implementations.

FIG. 1 illustrates a system 100 configured to generate project-level graphical user interfaces within a collaboration environment, in accordance with one or more implementations. An overview of a project may convey project information which describe different aspects of a project. The system 100 may manage and/or monitor project information within a collaboration environment so that information presented in a project-level graphical user interface details a project in an up to date and/or well summarized manner.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate generating project-level graphical user interfaces within a collaboration environment. The computer program components may include one or more of an environment state component 108, an update component 110, a user interface component 112, and/or other components.

Environment state component 108 may be configured to manage environment state information and/or other information used in maintaining a collaboration environment. The collaboration environment may be configured to facilitate interaction by users within the collaboration environment. The environment state information may include one or more of work unit records, project records, objective records, user records, and/or other records. The work unit records which may include work information comprising values for work unit parameters associated with units of work managed, created, and/or assigned within the collaboration environment. The project records may include project information including values for project parameters associated with projects managed within the collaboration environment. The objective records may include values for objective parameters associated with business objectives managed within the collaboration environment. The user records may include user information comprising values of user parameters. Individual projects may include an individual set of the units of work supporting the individual projects. An individual project and/or unit of work may support one or more business objectives.

The work information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, objectives, and/or other units of work one or more users should accomplish and/or plan on accomplishing. Units of work may be created by a given user for the given user and/or created by the given user and assigned to one or more other users. Individual units of work may include one or more of an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, values of work unit parameters may include one or more of a unit of work name, a unit of work description, one or more unit of work dates (e.g., a start date, a due date or end date, a completion date, and/or dates), one or more users linked to a unit of work (e.g., an owner, one or more collaborators, collaborator access information, and/or other information), role information, a status parameter (e.g., an update, a hardcoded status update, a completed/incomplete/mark complete, a measured status, a progress indicator, quantity of sub-work units remaining for a given unit of work, measure of urgency, and/or other status parameter), one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc. . . . ), state of a workspace for a given unit of work (e.g., application state parameters, application status, application interactions, user information, and/or other parameters related to the state of the workspace for a unit of work), one or more performance/productivity metrics for a given unit of work, hierarchical information, one or more custom fields (e.g., priority, cost, stage, and/or other custom fields), and/or other information.

In some implementations, the one or more work unit parameters may include one or more of a work assignment parameter, work completion parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

The values of the work assignment parameter describing units of work assigned to the individual users may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a status a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing by the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

Project information in project records may define values of project parameters for projects managed within the collaboration environment. The project parameters may characterize one or more projects managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project. The given project may include one or more units of work assigned to one or more users under the given project heading. In some implementations, projects may include one or more units of work that may directly facilitate progress toward fulfillment of the projects. Accordingly, completion of the set of units of work may directly contribute to progress toward fulfillment of the project. By way of non-limiting illustration, an individual project may be associated with a client and the units of work under the individual project heading may be work directly contributing to the fulfillment of a business relationship with the client.

The values of the project parameters may, by way of non-limiting example, include one or more of: one or more units of work within individual ones of the projects (which may include values of work unit parameters included in one or more work unit records), one or more users linked to the project (which may include values of user parameters defined by one or more user records), role information, one or more user comment parameters (e.g., a creator, a recipient, one or more followers, one or more other interested parties, content, one or more times, upvotes, other hardcoded responses, etc.), a project name, a project description, one or more project dates (e.g., a start date, a due date, a completion date, and/or other project dates), one or more project collaborators (e.g., an owner, one or more other project collaborators, collaborator access information, and/or other information), a status and/or progress (e.g., an update, a hardcoded status update, a measured status, quantity of units of work remaining in a given project, completed units of work in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

Role information may be specified in one or more of the work unit records, project records, user records, and/or other records. The role information may specify roles of the users within the units of work, the projects, and/or a business organization as a whole. The roles may convey expected contribution of the users in completing and/or supporting the units of work and/or the projects. The individual roles of individual users within the units of work may be specified separately from the individual roles of the individual users within the projects. The project parameters may include a project role parameter characterizing the individual roles of the individual users with respect to individual projects.

A role specified with respect to units of work and/or projects may be different from roles traditionally specified with respect to a business organization as a whole (e.g., President, CEO, intern, product designer, legal counsel, etc.). For example, an organization role may be "Product Designer"; a project role may be "Design Lead"; and a role on an individual unit of work may be "Approver."

A role within a unit of work may be specified based on one or more of a job title, a description of what the user should accomplish and/or plan on accomplishing for the given unit of work, and/or other specifications. By way of non-limiting illustration, a role within a unit of work may include one or more of general assignee, graphic designer, engineer, tester, writer, artist, mechanic, and/or other descriptions.

A role within a project (e.g., a "project-level role") may be specified based on a description of what the user may be supporting and/or plan on supporting for the given project, and/or other specifications. By way of non-limiting illustration, a role within a project may include one or more of owner, design, marketing, copy, legal, engineering, art director, and/or other descriptions. In some implementations, roles within a project may take on a more supervisory connotation than the roles within the individual units of work.

In some implementations, project parameters may include one or more of a description parameter, resources parameter, supporting parameter, supported parameter, supporters parameter, status parameter, and/or other parameters.

A description parameter may characterize a description of the individual projects. The description of the individual project may include a project statement and/or other descriptions about how to use the project. The description of the individual project may be defined when the project is created and may or may not be editable after creation. In some implementations, the description may only be edited by users assigned a given role. By way of non-limiting illustration, a value of a description parameter may include one or more of summary, background, purpose, and/or other descriptions. A summary of an individual project may include a basic explanation of what the project entails. A background may include a historical overview of the pertinent field of the project and what has been done in the past with respect to the field in which the project is involved in. A purpose of an individual project may include reasons why the project is being pursued and details of the project's innovation.

A resources parameter may characterize resource(s) of the individual projects. In some implementations, resources parameter may characterize internal or external resources that are associated to the project. Resources may include digital assets in the form of a file, a document, an attachment, a link to a project within the collaboration environment that may provide relevant information to the individual project, URL's, and/or other content. In some implementations, a resource may include an application program (e.g., word processing application, graphic design application, etc.). External resources 126 may include sources of information outside of system 100, external entities participating with system 100, and/or other resources. In some implementations, some or all of the functionality attributed herein to external resources 126 may be provided by resources included in system 100.

In some implementations, the values of the resources parameter may include instances of digital assets included in individual units of work supporting the individual projects. Instances may include how the digital asset appears on an individual user's unit of work. Digital assets may include one or more of a pdf, image file, online content, URL, and/or other assets. By way of non-limiting illustration, instances of digital assets may include a first pdf document in a first unit of work that began to be worked on by a first user. The instance of the first pdf document may be shared with a second user in a second unit of work, that is to be finalized by a second user. In some implementations, a URL may cause content to be pulled from the URL.

A supporting parameter may characterize individual units of work supporting the individual projects. The values of the supporting parameter may include the values of one or more of the work unit parameters of the individual units of work supporting the individual projects. In some implementations, one or more units of work may be indicated as milestones for the project and/or may have other tags and/or status associated therewith. In some implementations, milestones may be representative of predetermined progress in the completion of a project. By way of non-limiting illustration, given two milestones within an individual project, the first milestone may indicate 30% project completion, while a second milestone may indicate 60% project completion.

A supported parameter may characterize individual business objectives supported by the individual projects. The values of the supported parameter may include the values of one or more of the objective parameters of the individual business objectives supported by the individual projects.

A supporters parameter may characterize the users having project-level roles within the individual projects. The values of the supporters parameter may include the values of one or more user parameters of the users having the project-level roles within the individual projects. Users may be associated with certain user roles within a collaboration environment representing their position. Individual projects may be a scenario where a user's role changes, representing an individual position for the individual project.

In some implementations, the project parameters may include a status parameter characterizing status of the individual projects. The values of the status parameter may include the status of the individual projects. The status parameter may characterize status of the individual projects. In some implementations, the status of the individual projects may be characterized by activities that impact progress toward completion of the individual projects. Accordingly, the values of the status parameter may include descriptions of the activities that impact progress toward completion of the individual projects and/or other information. By way of non-limiting illustration, activities may include one or more of completing individual units of work, creating units of work, uploading assets to individual units of work, assigning start dates and/or due dates to the individual units of work, adding one or more units of work to an individual project, assigning one or more users to one or more units of work within the individual projects, updating a description of the individual projects and/or individual unit of work, assigning one or more users one or more roles within the individual projects at the project level, and/or other activities.

In some implementations, some activities may indirectly impact the progress toward completion of individual projects. By way of non-limiting illustration, activities that may indirectly impact the progress toward completion may one or more of viewing, commenting, sharing, tagging, and/or other activities. These activities may not directly impact the completion of units of work but may still reflect that users are active within the collaboration environment such that progress may be apparent. Viewing may refer to navigation to a project page displaying a project and/or work unit pages of units of work included in the project. Commenting may include one or more of adding text, emoticons, and/or other content information. The comments may be added into one or more of a comments sections, a thread, and/or a message board. Sharing may include providing links to individual project pages and/or individual units of work. Tagging may include mentioning individual users (e.g., via an "@" symbol pointer to users by username).

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with a set of units of work and/or projects that may indirectly facilitate progress toward fulfillment of the business objectives. The set of units of work and/or projects may not directly contribute to the progress. By way of non-limiting illustration, a connection between the set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with a set of units of work and/or projects that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work and/or projects that may indirectly (and/or directly) facilitate progress toward fulfillment of the user objectives. User objectives may be specified on an individual user basis.

Individual objective records may describe individual business objectives and identify sets of individual ones of the work unit records and/or project records that specify the units of work and/or projects as being associated with the individual business objectives.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record.

An objective record may define a business objective comprising a progress towards fulfillment, and a subordinate objective record may define a business objective comprising a subordinate progress towards fulfillment to the subordinate business objective. An objective record hierarchy may define a relationship between objective records.

Individual objective records may include hierarchical information defining an objective record hierarchy of the individual objective records. The hierarchical information of an objective record may include one or more of information identifying other objective records associated in an objective record hierarchy the objective record belongs to, a specification of the position of the objective record in the hierarchy, other relationships placed on the objective record by virtue of its position, and/or other information.

In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users. The values of the objective creation parameter may describe business objectives created by the individual users.

In some implementations, the business objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing business objectives owned by the individual users may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

The user information in the user records may include values of user parameters. The values of the user parameters may be organized in user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc. . . . ), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), progress information for one or more business objectives the user is associated with (business objectives owned by the user, of which the user is a collaborator, fulfilled by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

Environment state component 108 may be configured to manage information defining project-level graphical user interfaces corresponding to individual projects of the collaboration environment. By way of non-limiting illustration, the individual project-level graphical user interfaces may include individual sets of interface elements displaying the values of one or more of the project parameters of the individual projects. A first project-level graphical user interface may be associated with a first project. The first project-level graphical user interface may include a first set of user interface elements displaying the values of a first set of project parameters of the first project.

In some implementations, individual project-level graphical user interfaces may include individual sets of interface elements displaying the values of one or more of the project parameters of the individual projects. By way of non-limiting illustration, project-level graphical user interface may include user interface elements displaying values of one or more of a description parameter, resources parameter, supporting parameter, supported parameter, supporters parameter, status parameter, and/or other project parameters.

In some implementations, displaying the values of one or more of the project parameters of the individual projects may include determining visual representations of the values of the one or more project parameters. The visual representations may be one or more of numeric representations, graphical representations (e.g., charts, graphs, etc.), and/or other representations. In some implementations, visual representations may be direct representations. By way of non-limiting illustration, a value of a project parameter may be directly presented in a project-level graphical user interface. For example, a value of a project parameter for a project specifying that the project includes ten tasks may be represented in an interface element as "This project has ten tasks." In some implementations, visual representations may be indirect representations. By way of non-limiting illustration, a value of a project parameter may be used as a basis for determining a display that represents the value but may not directly and/or explicitly convey the value. By way of non-limiting illustration, a value of a project parameter for a project specifying that the project includes five out of ten tasks already being completed may be represented in an interface element as a pie chart that is half shaded to represent half of the project's tasks being completed.

In some implementations, the values of the status parameter may be represented by a visual representation in the form of a timeline. The timeline may present updates for the project (e.g., units of work that are marked complete, incomplete, late, etc.), current status of the project, a measure of completeness, indication of the project being on or off track, and/or any other updates by users. In some implementations, a user interface element may include a status indicator portion. The status indicator portion may display one or more of a measure of completeness (e.g., a measure of, or derived from, the quantity of complete units of work vs total units of work), indication of on track or off track (e.g., a measure of, or derived from, the quantity of complete units of work vs a quantity of days left until a due date of the project), status updates written by users, and/or other information. The timeline view may include an ordered list and/or arrangement that shows chronological ordering of the activities that impacted the progress toward completion of the individual projects. For individual points in time on the timeline view, a description of an activity which occurred at that point in time may be presented. In some implementations, the timeline view may start at a starting point in time and end at an ending point in time. The starting point in time may correspond to one or more of a start date of the project, a creation date of the project, and/or other point in time. The ending point in time may correspond to an end date of the project and/or a current date. In some implementations, the ending point in time may be open ended meaning the end date of the project may be dictated based on completion of a "final" unit of work making up the project.

In some implementations, the values of a supporting parameter may be visually represented as a list of units of work that support a project. The individual units of work may be visually represented by values of work unit parameters including, but not limited to, title, completion state, assignee, and/or other information. The list may be a quick reference to users of individual units of work that have been completed and/or of individual units of work that need to be addressed with respect to the project. In some implementations, individual units of work may be selected from the graphical user interface to take the user to a work unit page for an individual unit of work.

In some implementations, values of a supporters parameter may be visually represented by a roster of users having project-level roles. An individual user may be represented by an icon with an image of a user's face and/or avatar. By way of non-limiting illustration, the image may be accompanied with an interface element presenting a description of the user's project-level role, and/or other descriptors. In some implementations, individual icons representing individual users may provide access to individual user pages for the individual users.

In some implementations, values of a description parameter may be visually represented by a text display portion showing the disruption.

In some implementations, values of a resources parameter may be visually represented by an arrangement of one or more icons. Individual icons may represent individual resources. In some implementations, an individual icon may provide a link to a resource, may comprise an instance of a resource (e.g., PDF file), a URL, and/or other content. In some implementations, a visual representation of a URL may include content pulled from the URL and presented in the user interface.

In some implementations, values of a supported parameter may be visually represented as a list of business objectives supported by a project. The business objectives may be visual represented by values of objective parameters including, but not limited to title, status, associated dates, and/or other information. The list may be a quick reference to users of individual business objectives supported by the project. In some implementations, individual business objectives may be selected from the graphical user interface to take the user to a business objective page for the individual business objectives.

The update component 110 may be configured to dynamically update the information defining the project-level graphical user interfaces of the collaboration environment as the values of the one or more of the project parameters of the individual projects change.

In some implementations, the update component 110 may be configured to monitor use of the collaboration environment by the users to determine the change in the values of the one or more of the project parameters of the individual projects. Use of the collaboration environment by users may include actions by the user within the collaboration environment that change one or more values of one or more parameters of one or more records. The change in the values of the one or more of the project parameters of the individual projects may include one or both of user-initiated change in the values and/or automated change in the values. Automated change may be associated with rules within the collaboration environment that cause actions to be effectuated in response to occurrence of trigger events. Change may be measured based on one or more of quantity of change, frequency of change, character of changes, and/or other information. The character of change may refer to change from one specific value to another specific value. By way of non-limiting illustration, user-initiated change may be shown based on a user marking a unit of work from "incomplete" to "marked complete." By way of non-limiting illustration, automated change may be shown based on a user uploading an asset to a unit of work, which triggers an automatic change in the unit of work from being "incomplete" to "completed."

In some implementations, the update component 110 may be configured to dynamically update the information defining the project-level graphical user interfaces based on the monitoring of the use of the collaboration environment.

In some implementations, the update component 110 may obtain user input information characterizing user input into one or more individual project-level graphical user interfaces, and/or other user interfaces. The user input may reflect updated values of the status parameter of the individual projects. By way of non-limiting illustration, the user input may include text descriptions.

In some implementations, environment state information may be updated as users continue to interact with the collaboration environment via the user interfaces over time. The environment state component 108 may store and/or archive the environment state information periodically and/or based on user request to archive. In some implementations, the environment state component 108 may store historical environment state information specifying historical user information, historical work information, historical project information, historical objective information, user interaction history, and/or other information.

In some implementations, the user interface component 112 may be configured to effectuate presentation of individual project pages displaying the individual projects. The individual project pages may provide access to the individual project records of the individual projects. The individual project-level graphical user interfaces may be accessed via the individual project pages. By way of non-limiting illustration, the project-level graphical user interfaces may present certain project information giving an overview of the project. Access to the project records of the individual projects may enable users to obtain more in-depth project information.

In some implementations, the user interface component 112 may be configured to provide access to the individual project-level graphical user interfaces of the individual projects from the individual project pages. By way of non-limiting illustration, the individual project-level graphical user interfaces may comprise a subset of the individual project pages. In some implementations, presentation of a subset of individual project pages may be based on selection of tabs at the top of the project pages. These tabs may be organized within the project pages according to different views of project information for the individual projects. By way of non-limiting illustration, a user may provide input to specifically view an individual project-level graphical user interface from a project page. Other views of project information for the individual projects may include one or more of list views of project information, calendar (or timeline) views of project information, and/or other views.

The user interface component 112 may be configured to effectuate presentation of the project-level graphical user interfaces for the individual projects in the collaboration environment. By way of non-limiting illustration, the first project-level graphical user interface may be presented to dynamically reflect the values of the first set of project parameters of the first project. In dynamically reflecting the values of the first set of project parameters of the first project, the project information described by the project parameters will reflect up to date information.

In some implementations, user interface component 112 may be configured to obtain input information and/or other information. The input information may convey user input into the user interface presented on the client computing platform(s) 104. A set of user interface elements may be provided on the user interface to facilitate the user input and/or other user interaction with the user interface. The user interface elements may include one or more of text input fields, drop down menus, check boxes, display windows, virtual buttons, and/or other elements configured to facilitate user interaction.

Figure 3:
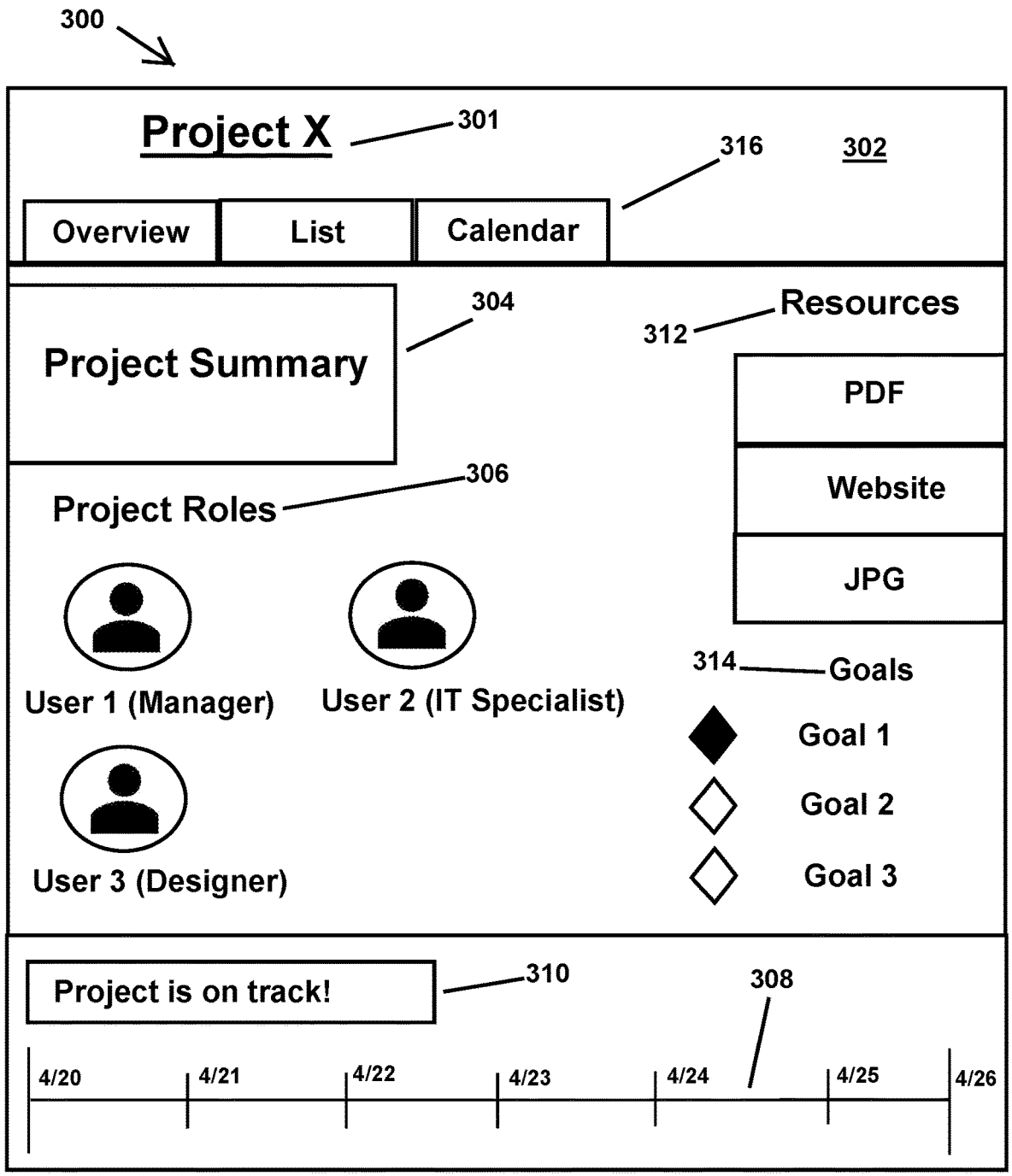
FIG. 3 illustrates a user interface, in accordance with one or more implementations.

FIG. 3 illustrates a user interface 300, in accordance with one or more implementations. The user interface 300 may include a view of a collaboration environment. In particular, the user interface 300 may comprise a project-level graphical user interface 302 for a project 301. The project-level graphical user interface 302 may comprise a subset of a project page for the project 301. A user interface element 316 may correspond to a series of tabs which may be selected to present views of the project 301. In some implementations, the project-level graphical user interface 302 may correspond to the "overview" tab. For illustrative purposes, the project 301 is named "Project X."

The user interface 300 may present a set of interface elements displaying values of project parameters of the project 301. A user interface element 304 may correspond to a description parameter, presenting a summary of the project 301. A user interface element 306 may correspond to a supporters parameter, presenting a roster of users linked to the project 301. A user interface element 308 may correspond to a status parameter, presenting a timeline including status of units of work supporting the project 301. By way of non-limiting illustration, as the units of work are completed, interface element 310 may provide a textual message of the most current update with regards to a unit of work and the progress to completion of the project 301. A user interface element 312 may correspond to a resource parameter of the project 301, presenting one or more icons representing individual resources. A user interface element 314 may correspond to a supported parameter of the project 301, presenting one or more business objectives (described as "Goals" for illustrative purposes) supported by the project 301. It is noted that the arrangement of the individual interface elements is for illustrative purposes only and is not to be considered limiting. Instead, the arrangement may be customized by a user, and/or pre-set and specified based on a template used universally for one or more users.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc. . . . ) or a drive (e.g., a disk drive, etc. . . . ). Electronic storage 128 may include one or more of optically readable storage media (e.g., optical disks, etc. . . . ), magnetically readable storage media (e.g., magnetic tape, magnetic hard drive, floppy drive, etc. . . . ), electrical charge-based storage media (e.g., EEPROM, RAM, etc. . . . ), solid-state storage media (e.g., flash drive, etc. . . . ), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
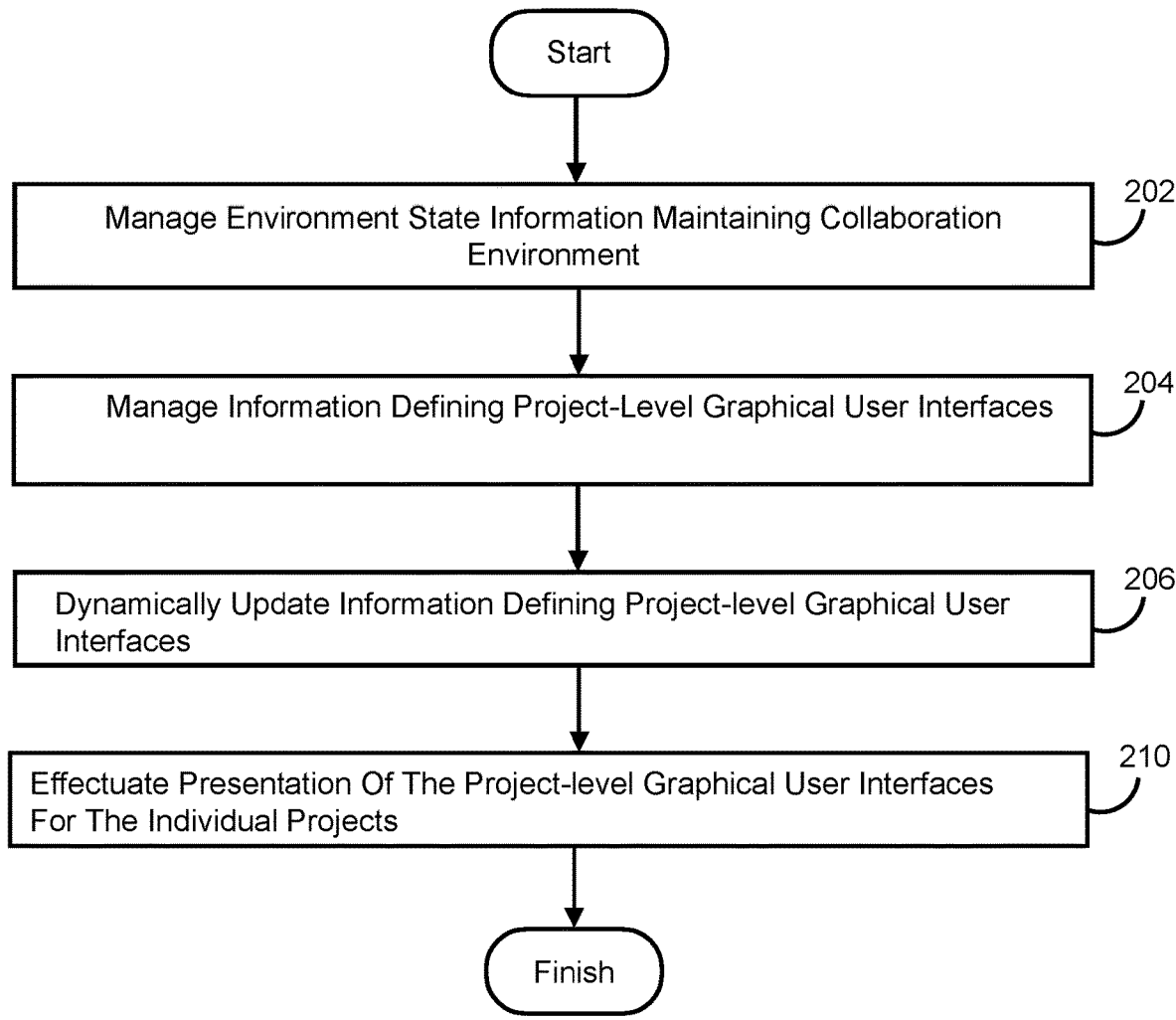
FIG. 2 illustrates a method to generate project-level graphical user interfaces within a collaboration environment, in accordance with one or more implementations.

FIG. 2 illustrates a method 200 to generate project-level graphical user interfaces within a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment and/or other information. The collaboration environment may be configured to facilitate interaction by users with the collaboration environment. The environment state information may include work unit records, project records, objective records, and/or other records. The work unit records may include values for work unit parameters associated with units of work managed, created, and/or assigned within the collaboration environment. The project records may include values for the project parameters associated with projects managed within the collaboration environment. The objective records may include values for objective parameters associated with business objectives managed within the collaboration environment. In some implementations, individual projects may include individual set of the units of work supporting the individual projects. Operation 202 may be performed by one or more hardware processors configured by machine-readable instructions including a component that is the same as or similar to environment state component 108, in accordance with one or more implementations.

An operation 204 may manage information defining project-level graphical user interfaces of the collaboration environment. The individual project-level graphical user interfaces may correspond to individual projects. By way of non-limiting illustration, the individual project-level graphical user interfaces may include individual sets of interface elements displaying the values of one or more of the project parameters of the individual projects. A first project-level graphical user interface may be associated with a first project. The first project-level graphical user interface may include a first set of user interface elements displaying the values of a first set of project parameters of the first project. Operation 204 may be performed by one or more hardware processors configured by machine-readable instructions including a component that is the same as or similar to environment state component 108, in accordance with one or more implementations.

An operation 206 may dynamically update the information defining the project-level graphical user interfaces of the collaboration environment as the values of the one or more of the project parameters of the individual projects change. Operation 206 may be performed by one or more hardware processors configured by machine-readable instructions including a component that is the same as or similar to update component 110, in accordance with one or more implementations.

An operation 210 may effectuate presentation of the project-level graphical user interfaces for the individual projects in the collaboration environment. By way of non-limiting illustration, the first project-level graphical user interface may be presented to dynamically reflect the values of the first set of project parameters of the first project. Operation 210 may be performed by one or more hardware processors configured by machine-readable instructions including a component that is the same as or similar to user interface component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate project overview pages within a collaboration environment, the system comprising:
   one or more physical processors configured by machine-readable instructions to:
      manage, by a server, environment state information maintaining a collaboration environment, the collaboration environment being configured to facilitate interaction by users with the collaboration environment, the users interacting with the collaboration environment through remotely located client computing platforms communicating with the server over one or more Internet connections, the environment state information including work unit records, project records, and objective records, the work unit records including values for work unit parameters associated with units of work managed, created, and/or assigned within the collaboration environment, the project records including values for project parameters associated with projects managed within the collaboration environment, the objective records including values for objective parameters associated with business objectives managed within the collaboration environment, wherein individual projects include individual sets of the units of work supporting the individual projects;
      establish the one or more Internet connections between the server and the remotely located client computing platforms;
      effectuate communication of user interface information from the server to the remotely located client computing platforms over the one or more Internet connections to cause the remotely located client computing platforms to present a user interface of the collaboration environment displaying individual project pages, the individual project pages providing access to the values of the project parameters included in individual project records of the individual projects, the individual project pages including a first project page that provides access to the values of a first set of the project parameters of a first project record for a first project;

manage, by the server, information defining project overview pages of the collaboration environment, individual project overview pages corresponding to the individual project records of the individual projects, wherein the individual project overview pages include individual sets of page elements displaying the values of individual subsets of the project parameters included in the individual project records of the individual projects, a first project overview page being associated with the first project record, the first project overview page including a first set of page elements displaying the values of a first subset of the project parameters within the first set of the project parameters of the first project record;

dynamically update, by the server, the information defining the project overview pages of the collaboration environment as the values of the project parameters of the individual project records change;

obtain, by the server, input information conveying user input into the individual project pages of the individual project records displayed in the user interface of the collaboration environment at the remotely located client computing platforms, the user input including selection of individual user interface elements displayed on the individual project pages, the selection of the individual user interface elements causing the user interface to navigate from the individual project pages to the individual project overview pages such that the individual project overview pages comprise subsets of the individual project pages, wherein the user input includes first user input into the first project page including first selection of a first user interface element on the first project page, the first selection of the first user interface element causing the user interface to navigate from the first project page to the first project overview page such that the first project overview page is a subset of the first project page and is navigated to through the first project page, wherein the first user interface element includes a drop down menu, a check box, a virtual tab, or a virtual button; and in response to obtaining the input information, cause, by the server, the user interface presented by the remotely located client computing platforms to navigate from the individual project pages to the individual project overview pages, the first project overview page navigated to in response to obtaining the input information conveying the first selection of the first user interface element on the first project page, the first project overview page dynamically reflecting the values of the first subset of the project parameters of the first project record, the first project overview page including:
  a first page element displaying a summary of the first project;
  a second page element displaying a roster of users linked to the first project;
  a third page element displaying a timeline of status of work supporting the first project;
  a fourth page element displaying a textual message of a most current update to the status;
  a fifth page element displaying graphical icons representing digital assets that support the first project, the digital assets including a PDF, an image file, and a URL; and
  a sixth page element displaying representations of one or more business objectives supported by the first project.

2. The system of claim 1, wherein the project parameters include:
  a description parameter characterizing individual summaries of the individual projects;
  a resources parameter characterizing individual sets of resource(s) of the individual projects;
  a supporting parameter characterizing individual units of work supporting the individual projects;
  a supported parameter characterizing individual business objectives supported by the individual projects;
  a supporters parameter characterizing the users having project-level roles within the individual projects; and
  a status parameter characterizing individual status of the individual projects.

3. The system of claim 2, wherein the values of the resources parameter include instances of individual digital assets included in the individual units of work supporting the individual projects.

4. The system of claim 2, wherein the values of the supporting parameter include the values of one or more of the work unit parameters of the individual units of work supporting the individual projects.

5. The system of claim 2, wherein the values of the supported parameter include the values of one or more of the objective parameters of the individual business objectives supported by the individual projects.

6. The system of claim 2, wherein the values of the supporters parameter include the values of one or more user parameters of the users having the project-level roles within the individual projects.

7. The system of claim 2, wherein the values of the status parameter include the status of the individual projects, wherein the status of the individual projects is characterized by activities that impact progress toward completion of the individual projects.

8. The system of claim 1, wherein the one or more physical processors are further configured by the machine-readable instructions to:
  monitor use of the collaboration environment by the users to determine the change in the values of the project parameters of the individual project records; and
  dynamically update the information defining the project overview pages based on monitoring the use of the collaboration environment.

9. The system of claim 8, wherein the change in the values of the project parameters of the individual project records includes one or both of user-initiated change in the values or automated change in the values.

10. A method to generate project overview pages within a collaboration environment, the method comprising:
  managing, by a server, environment state information maintaining a collaboration environment, the collaboration environment being configured to facilitate interaction by users with the collaboration environment, the users interacting with the collaboration environment through remotely located client computing platforms communicating with the server over one or more Internet connections, the environment state information including work unit records, project records, and objective records, the work unit records including values for work unit parameters associated with units of work managed, created, and/or assigned within the collaboration environment, the project records including values for project parameters associated with projects managed within the collaboration environment, the objective records including values for objective parameters associated with business objectives managed within the collaboration environment, wherein individual projects include individual sets of the units of work supporting the individual projects;

establishing the one or more Internet connections between the server and the remotely located client computing platforms;

effectuating communication of user interface information from the server to the remotely located client computing platforms over the one or more Internet connections to cause the remotely located client computing platforms to present a user interface of the collaboration environment displaying individual project pages, the individual project pages providing access to the values of the project parameters included in individual project records of the individual projects, the individual project pages including a first project page that provides access to the values of a first set of the project parameters of a first project record for a first project;

managing, by the server, information defining project overview pages of the collaboration environment, individual project overview pages corresponding to the individual project records of the individual projects, wherein the individual project overview pages include individual sets of page elements displaying the values of individual subsets of the project parameters of the individual project records, a first project overview page being associated with the first project record, the first project overview page including a first set of page elements displaying the values of a first subset of the project parameters within the first set of the project parameters of the first project record;

dynamically updating, by the server, the information defining the project overview pages of the collaboration environment as the values of the project parameters of the individual project records change;

obtaining, by the server, input information conveying user input into the individual project pages of the individual project records displayed in the user interface of the collaboration environment at the remotely located client computing platforms, the user input including selection of individual user interface elements displayed on the individual project pages, the selection of the individual user interface elements causing the user interface to navigate from the individual project pages to the individual project overview pages such that the individual project overview pages comprise subsets of the individual project pages, the user input including first user input into the first project page, the first user input including first selection of a first user interface element on the first project page, the first selection of the first user interface element causing the user interface to navigate from the first project page to the first project overview page such that the first project overview page is a subset of the first project page and is navigated to through the first project page, wherein the first user interface element includes a drop down menu, a check box, a virtual tab, or a virtual button; and in response to obtaining the input information, causing, by the server, the user interface presented by the remotely located client computing platforms to navigate from the individual project pages to the individual project overview pages, including navigating to the first project overview page in response to obtaining the input information conveying the first selection of the first user interface element on the first project page, the first project overview page dynamically reflecting the values of the first subset of the project parameters of the first project record, the first project overview page including:
  a first page element displaying a summary of the first project;
  a second page element displaying a roster of users linked to the first project;
  a third page element displaying a timeline of status of work supporting the first project;
  a fourth page element displaying a textual message of a most current update to the status;
  a fifth page element displaying graphical icons representing digital assets that support the first project, the digital assets including a PDF, an image file, and a URL; and
  a sixth page element displaying representations of one or more business objectives supported by the first project.

11. The method of claim 10, wherein the project parameters include:
  a description parameter characterizing individual summaries of the individual projects;
  a resources parameter characterizing individual sets of resource(s) of the individual projects;
  a supporting parameter characterizing individual units of work supporting the individual projects;
  a supported parameter characterizing individual business objectives supported by the individual projects;
  a supporters parameter characterizing the users having project-level roles within the individual projects; and
  a status parameter characterizing individual status of the individual projects.

12. The method of claim 11, wherein the values of the resources parameter include instances of individual digital assets included in the individual units of work supporting the individual projects.

13. The method of claim 12, wherein the values of the supporting parameter include the values of one or more of the work unit parameters of the individual units of work supporting the individual projects.

14. The method of claim 13, wherein the values of the supported parameter include the values of one or more of the objective parameters of the individual business objectives supported by the individual projects.

15. The method of claim 14, wherein the values of the supporters parameter include the values of one or more user parameters of the users having the project-level roles within the individual projects.

16. The method of claim 15, wherein the values of the status parameter include the status of the individual projects, wherein the status of the individual projects is characterized by activities that impact progress toward completion of the individual projects.

17. The method of claim 10, further comprising:
  monitoring use of the collaboration environment by the users to determine the change in the values of the project parameters of the individual project records; and dynamically updating the information defining the project overview pages based on the monitoring.

18. The method of claim 17, wherein the change in the values of the project parameters of the individual project records includes one or both of user-initiated change in the values or automated change in the values.

* * * * *